PLATED WIRE MEMORY ELEMENT
Filed June 30, 1972
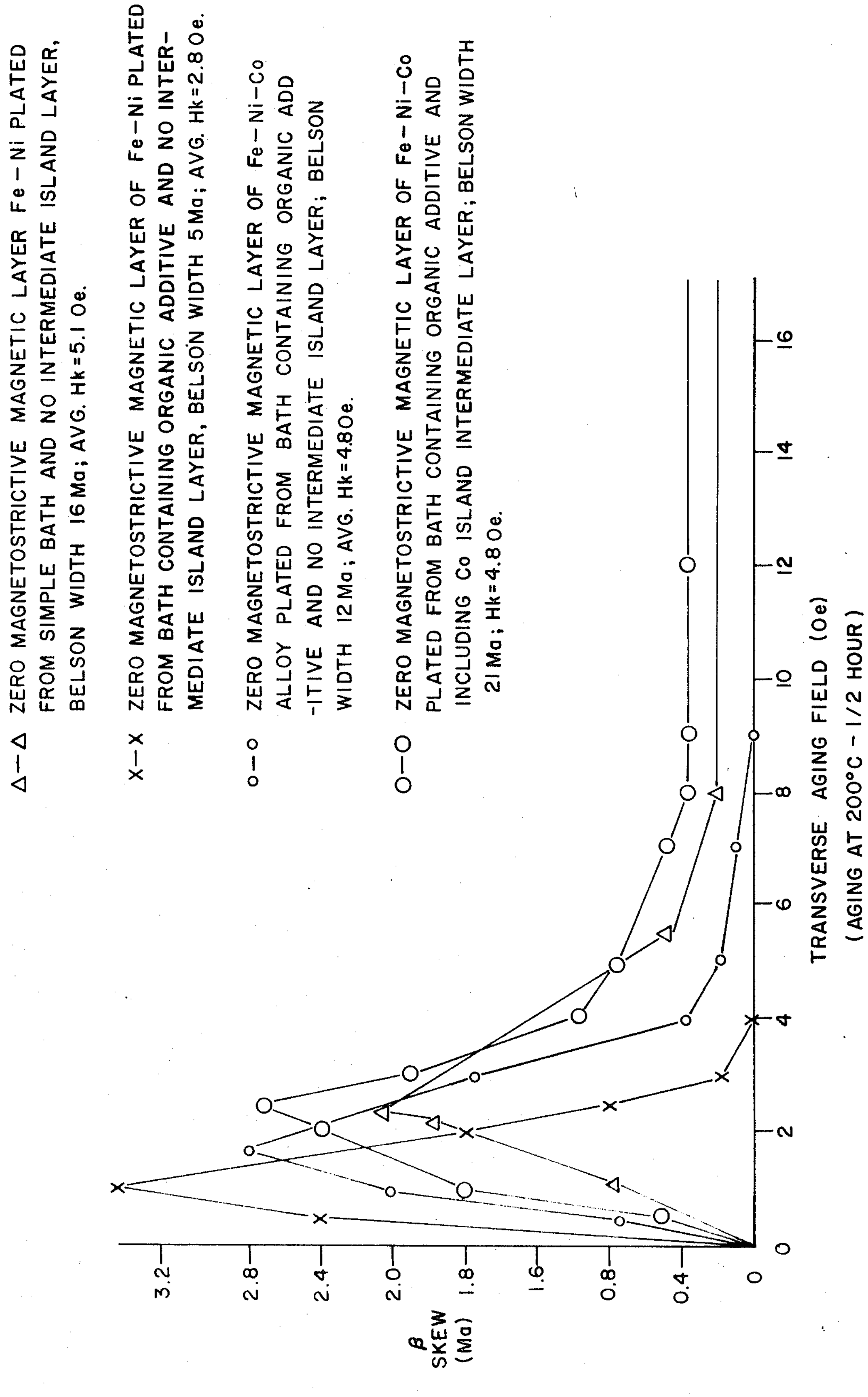

United States Patent Office 3,814,591

Patented June 4, 1974

3,814,591

PLATED WIRE MEMORY ELEMENT

James O. Holmen, Minnetonka, and Robert P. Ulmer, Minneapolis, Minn., assignors to Honeywell Inc., Minneapolis, Minn.

Filed June 30, 1972, Ser. No. 267,785
Int. Cl. B32b *15/00*
U.S. Cl. 29—194 15 Claims

ABSTRACT OF THE DISCLOSURE

A plated wire memory unit which combines increased read-write speed with good non-destructive readout (NDRO) properties includes a non-magnetic wire substrate, a non-magnetic layer of controlled roughness overlaying the substrate, a thin layer of material selected from a group consisting of cobalt, nickel, iron or magnetic alloys thereof overlaying the non-magnetic layer and a zero magnetostrictive magnetic layer of nickel-iron-cobalt alloy overlaying the thin layer. The final nickel-iron-cobalt alloy zero magnetostrictive magnetic layer is electrodeposited from an electrolytic bath containing an aromatic sulfonic acid or a substituted aromatic sulfonic acid additive.

CROSS-REFERENCE TO RELATED APPLICATION

Reference is made to a co-pending application by James O. Holmen, here a co-inventor, Ser. No. 185,997, filed Oct. 4, 1971, and assigned to the same assignee, which is also concerned with a modified plated wire memory element. By that invention, a thin layer of cobalt, nickel, iron, or magnetic alloys of these materials is plated on the memory element beneath the final layer zero magnetostrictive magnetic layer to improve the non-destructive readout (NDRO) properties of the magnetic wire memory element without having any effect on the wire cycle time; whereas the plated wire memory element of the present invention combines these improved non-destructive readout properties (NDRO) with a final zero magnetostrictive magnetic layer of nickel-iron-cobalt which greatly improves the read-write speed of the wire and overcomes the so-called "Fast Burst Read Disturb" problem.

BACKGROUND OF THE INVENTION

Field of the invention

The present invention is directed to a magnetic memory element of the plated wire type having an improved switching time.

The ever increasing need for higher speed, high capacity magnetic memories with non-destructive readout has led to an intensive research effort in the direction of utilizing magnetic thin films of various types and, evenutally, to the development of the plated wire memory element. Basically, the plated wire memory element consists of a non-magnetic wire substrate which is overlaid with a coating of magnetic material. In the processing of forming the coating of magnetic material, a high magnetic anistropy is established which favors a selected orientation in the circumferential direction. Information is then stored according to the sense of the circumferential magnetization of the plated wire. This forms the basis for binary information storage wherein the information is stored in one of the two possible magnetization directions which are commonly referred to as the "one" and "zero" directions. Reading out of the stored information is accomplished by the use of a word strap which runs orthogonal to, and envelops the plated wire. Current in the word strap produces a magnetic field along the axis of the plated wire which, in turn, causes the magnetization vector to be displaced by some angle from its "one" or "zero" circumferential orientation, thereby causing a component of the magnetization in the circumferential direction to decrease. This change causes a voltage to appear at the ends of the plated wire where it can be sensed. In order to achieve non-destructive readout, the amplitude of the word current is so controlled that the magnetization returns to its original position when the current is turned off.

Typical plated wire consists of a non-magnetic wire substrate which is commonly of berryllium-copper or a phosphor-bronze alloy, a non-magnetic intermediate layer, normally of copper, having a controlled roughness and overlaying the wire substrate and a final zero magnetostrictive magnetic layer of a nickel-iron alloy. Prior art plated wire memory element of the general type are illustrated and described by Richards et al. in "Topography Control of Plated Wire Memory Elements," *IEEE Transactions on Magnetics,* volume MAG–4, No. 3, September 1968, and also by Mathias and Fedde in "Plated Wire Technology: A Critical Review", *IEEE Transactions on Magnetics,* volume MAG–5, No. 4, December 1969.

In addition to the problem of destructive readout occasioned by exceeding the permissible value of the word current in reading, a further problem associated with the time involved in reading and writing in plated wire magnetic memories has been encountered. This further disturb phenomenon rests in the fact that such plated wire is also sensitive to the time of the first read pulse after writing and/or the frequency of the read pulses in the plated wire. Thus, in other words, there is a minimum delay or threshold time which must be observed, in addition to current limitation, in order to avoid disturbing the signal which has previously been written in and this latter phenomenon has been termed the "Fast Burst Read Disturb" problem. It is the solving of this latter problem thereby increasing the speed of operation of such a memory toward which the thrust of the present invention is directed.

SUMMARY OF THE INVENTION

The plated wire memory element of the present invention combines proven non-destructive readout properties with a far superior "Fast Burst Read Disturb" threshold time. The plated wire memory element of the invention incudes a nonmagnetic wire substrate, a non-magnetic layer of controlled roughness overlaying the substrate, a thin layer of cobalt, nickel, iron, or magnetic alloys of these materials overlaying the magnetic layer, and a zero magnetostrictive layer of iron-nickel-cobalt alloy overlaying the thin layer. The final zero magnetostrictive magnetic layer of iron-nickel-cobalt is applied by electroplating from an electrochemical bath containing an organic additive from the class consisting of aromatic sulfonic acids and substituted aromatic sulfonic acids. These typically include, for example, 4-amino-1-naphthalene sulfonic acid sodium salt (ANS) or 1,3,6-naphthalene trisulfonic acid trisodium salt (NTS).

BRIEF DESCRIPTION OF THE DRAWING

FIG. 1 shows the value of the beta skew versus the transverse aging field for various wires using the skew aging as an indication of NDRO properties of each.

DESCRIPTION OF THE PREFERRED EMBODIMENT

The plated wire memory element of the present invention which combines excellent NDRO properties with improved "Fast Burst Read Disturb" threshold time utilizes a laminar or layered structure comprising four layers. The first layer is a non-magnetic wire substrate consisting of a beryllium-copper or phosphor-bronze alloy having nominal diameter of from between about 1 mil to about 10 mills. Overlaying this substrate wire is a non-magnetic layer of controlled roughness, normally copper, having a thickness of from between about $3 \times 10^3$ A. and about $20 \times 10^3$ A. Other materials having the requisite properties may be used, including non-magnetic materials such as gold, for example. The technology associated with the first two layers in the layered plated wire magnetic memory are well developed and should require no further explanation to one skilled in the art. Overlaying the non-magnetic layer of controlled roughness is a third layer which consists of a thin layer of cobalt, nickel, iron or magnetic alloys of these materials. In the preferred embodiments of the present invention, the thin layer is normally made of cobalt and has a thickness of from between about 50 A. to about 300 A. and typically is about 100 A. This layer is more fully illustrated and described in the above-mentioned co-pending application. As actually formed, this third thin layer is discontinuous in the manner of forming "islands" of the cobalt or other material. The final layer of the plated wire memory element of the present invention consists of a zero magnetostrictive magnetic layer of the ternary iron-nickel-cobalt alloy which is electroplated from an electrochemical bath containing organic additives in the nature of aromatic sulfonic acids and substituted compounds of aromatic sulfonic acids. The general operating range is for the ternary alloy plating bath as follows:

General operating ranges for ternary plating bath for electroplating zero magnetostrictive magnetic layer The bath for plating the magnetic film of the invention has generally the following composition parameters:

| | G./l. |
|---|---|
| $NiSO_4 \cdot 6H_2O$ | 200–400 |
| $H_3BO_3$ | 10–50 |
| $FeSO_4 \cdot 7H_2O$ | 3–15 |
| $NiCl_2 \cdot 6H_2O$ | 0–5 |
| Organic additive (aromatic sulfonic or substituted aromatic sulfonic acid) | 0.01–10 |
| $CoSO_4 \cdot 7H_2O$ | 0.05–20 |

Bath pH, 2.0–3.2; Bath temperature 35–55° C.
Intermediate island thickness, 5–300 A. (Cu, Ni, or Fe).
Film thickness, 3000 A.–10,000 A.
Wire diameter, 0.001"–0.010".

One particular bath which has been successfuldly used appears in the following illustration.

ILLUSTRATION I

A non-magnetic beryllium-copper wire having a nominal diameter of approximately 5 mils formed the substrate which was then coated in a well-known manner with a layer of copper of controlled roughness having a thickness of about 11,000 A. A third discontinuous layer of cobalt "islands" was then applied using the techniques of the above-mentioned co-pending application. The thicknes of this cobalt layer was about 80 A. The final zero magnetostrictive magnetic Ni-Fe-Co thin film was plated to a thickness of 7500 A. from the following solution:

Typical bath & plating condition

| | Gl/l. |
|---|---|
| $NiSO_4 \cdot 6H_2O$ | 324 |
| $H_3BO_3$ | 25 |
| $FeSO_4 \cdot 7H_2O$ | 7 |
| $NiCl_2 \cdot 6H_2O$ | 1.5 |
| 4-amino-1-naphthalene sulfonic acid-sodium salt | 0.1 |
| $CoSO_4 \cdot 7H_2O$ | 0.22 |

Bath pH, 3.1.
Bath temperature, 39° C.
Film thickness, 7500 A.
Wire diameter, 0.005".

As a final step, the wire is annealed at 380° C. for about 10 sec.

Among organic additives in addition to that of Illustration I found to be effective in the ternary plating bath used to deposit the zero magnetostrictive magnetic layer in accordance with the present invention, are those appearing in the list below:

8-amino-1,3,6-napthalene-trisulfonic acid trisodium salt (ANTS)
1,3,6-naphthalene trisulfonic acid trisodium salt (NTS)
2,7-napthalene-disulfonic acid disodium salt (NDS)
2-napthalenesulfonic acid sodium salt (NS)
1,3-benzene disulfonic acid sodium salt (BD)

Probably the most important advance associated with the present invention lies in the combination of the composition of the final zero magnetostrictive magnetic layer, the effect imparted thereto by the use of the above-mentioned organic plating bath additives and the use of the intermediate discontinuous "islands" layer. Thus, all of these factors are seen to contribute accumulatively toward the final improved performance of the plated wire magnetic memory of the present invention.

Table I, below, shows the relationship between the various modifications of the combination of the present invention including their effect on the "Fast Burst Read Disturb" threshold time and the general NDRO properties of wire incorporating such constituents.

TABLE I

| Type of element | Fast burst read disturb threshold time | NDRO properties |
|---|---|---|
| Zero magnetostrictive magnetic layer of Fe-Ni plated from a simple bath and no intermediate island layer (prior art wire). | Greater than one microsecond. | Good NDRO. |
| Zero magnetostrictive magnetic layer of Fe-Ni plated from a simple bath with intermediate cobalt island layer. | From approximately 650 nanoseconds to 750 nanoseconds. | Excellent. |
| Zero magnetostrictive magnetic layer of Fe-Ni plated from a simple bath containing organic additive and no intermediate island layer. | 200 nanoseconds to 400 nanoseconds. | Poor (DRO). |
| Zero magnetostrictive magnetic layer of Fe-Ni-Co plated from bath containing organic additives and no intermediate island layer. | Approximately 100 nanoseconds—very fast. | Exhibits only partial NDRO—some DRO still exhibited. |
| Zero magnetostrictive magnetic layer or Fe-Ni-Co plated from bath containing organic additive and including Co island intermediate layer (present invention). | do | Excellent. |

Fast Burst Read Disturb occurs if information is read out too soon after writing. Thus, magnetization reversal, or partial reversal can take place because the magnetization vector has not yet come to an equilibrium position. The time required for the magnetization vector to come to the equilibrium position is the Fast Burst Read Disturb threshold time and it is the minimum delay time which must be observed in the read-write cycle of the memory element. In order for the memory element to be capable of switching rapidly, the wire must be plated using the above-mentioned organic additives which refine the grain structure and relieve film stresses. These organic additives act as moderate stress relievers to make the final film behave in a more ideal manner, however, such "ideal" films tend to possess poor NDRO effecting the properties. The addition of cobalt both in the form of topography control such as in the deposition of the intermediate "islands" and in the final alloy layer results in improved NDRO properties. Thus, it is the combination of all of these effects and the magnetic plated wire magnetic memory unit of the invention combines good NDRO properties associated with the cobalt "islands" and the addition of cobalt to the final permalloy layer and greatly increased switching speed imparted to the wire through the use of the above-mentioned organic additives.

In order for a film to be capable of operating in the NDRO mode, it has been observed that a wide range of $H_k$ factors must be present in the film. Thus "$H_k$ magnitude dispersion" has been found to be increased by the addition of cobalt to the permalloy nickel-iron final wire layer and even more enhanced if this is combined with the deposition of intermediate "islands" of cobalt, nickel or iron prior to the deposition of the final zero magnetostrictive magnetic film.

If a wire is magnetized and then aged at elevated temperatures in the presence of a transverse D.C. field, the wire will develop skew. No skew will develop if the magnetization vector is either not rotated from the easy axis during aging or ir rotated 90° (effective $H_k$ field). If there are components of $H_k$ which are relatively high, the wire will exhibit skew aging even in the presence of high transverse aging fields, therefore, the curve of induced skew versus transverse field gives a direct indication of $H_k$ magnitude dispersion with the highest dispersion and greatest NDRO limit shown by attaining out of the skew at high aging fields. The width of the Belson test trace is also a good indication of NDRO operating capability as the Belson trace width increases the NDRO limit increases and greater operating tolerances and less resistance to crawl and skew effects are evident.

FIG. 1 is used to illustrate the above-described effects as evidenced by the plot of induced skew vs. transverse aging field for various magnetic plated wires. Thus, the trace widths and average $H_k$ values are also shown in a legend for the wires plotted. This figure shows the effect of the various contributing factors in the wire of the present invention as they effect the NDRO properties of the wire. The results of this data are as can be seen from the figure are essentially the same as that tabulated in Table I. Thus, the combination of the intermediate layer of cobalt "islands," addition of cobalt to the final permalloy zero magnetostrictive magnetic layer and the use of the organic sulfonic acid derivative additives in the final plating bath are shown to combine to give the best trailing skew as illustrated in FIG. 1. FIG. 1 also shows the prior art comparison curve which is illustrated by the triangle plot showing that no loss of NDRO properties is shown by the higher speed wire of the present invention. The curve also illustrates the adverse effect on NDRO properties of the organic additives alone and generally bears out the results shown in Table I.

It is also to be understood that this invention has been disclosed with reference to a preferred embodiment and it is, of course, possible to make changes in the form and detail without departing from the basic invention. In particular, the plating bath conditions described and the specific additive used in the plating bath is included for illustrative purposes only and that one skilled in the art of electroplating will readily recognize that a variety of adjustments can be made in the exact bath conditions without detriment to the final plated layers.

The embodiments of the invention in which an exclusive property or right is claimed are defined as follows:

1. A plated wire memory element comprising
- a non-magnetic wire substrate,
- a non-magnetic layer of controlled roughness overlaying said substrate,
- a thin, discontinuous layer of material selected from the group consisting of cobalt, nickel, iron or magnetic alloys thereof overlaying said non-magnetic layer,
- and zero magnetostrictive magnetic layer including nickel, iron and cobalt overlaying said thin layer.

2. A memory element as claimed in claim 1, wherein the zero magnetostrictive magnetic layer contains in the range of from about 78% to 82% nickel, from about 18% to 22% iron and from about 0.1% to 5% cobalt.

3. A memory element as claimed in claim 1, wherein said zero magnetostrictive magnetic layer is electrodedeposited from an electrochemical bath containing an organic additive from the class consisting of aromatic sulfonic acids and substituted aromatic sulfonic acids.

4. A memory element as claimed in claim 2 wherein said organic bath additive is one selected from the group consisting of 4-amino-1-naphthalene sulfonic acid sodium salt
8-amino-1,3,6-naphthalene-trisulfonic acid trisodium salt
1,3,6 naphthalene trisulfonic acid trisodium salt
2,7 naphthalene-disulfonic acid disodium salt
2-naphthalenesulfonic acid sodium salt
1,3-benzene disulfonic acid sodium salt.

5. A memory element as claimed in claim 3 wherein the concentration of said additive in said plating bath is such as to impart magnetic properties to the plated layer equivalent to about 0.2 g./l. of 4 amino-1-naphthalene sulfonic acid sodium salt.

6. A memory element as claimed in claim 3, wherein the plating bath contains, approximately 0.02 g./l. to approximately 4.0 g./l. 1,3,6-naphthalene trisulfonic acid-trisodium salt.

7. A memory element as claimed in claim 3 wherein the zero magnetostrictive magnetic layer is placed from a bath containing from about 0.02 g./l. to about 0.4 g./l. of 4-amino-1-naphthalene sulfonic acid sodium salt.

8. A memory element as claimed in claim 1, wherein a zero magnetostrictive magnetic layer is placed from a bath comprising 200–400 g./l. $NiSO_4 \cdot 6H_2O$, 3–15 g./l. $FeSO_4 \cdot 7H_2O$, 0.05–20 g./. $CoSO_4 \cdot 7H_2O$ and 0.01–10 g./l. aromatic sulfonic or substituted aromatic sulfonic acid.

9. A memory element as claimed in claim 1, wherein said zero magnetostrictive magnetic layer has a thickness of from about 3,000 A. and about 10,000 A.

10. A memory element as claimed in claim 1, wherein the non-magnetic wire substrate comprises a beryllium-copper alloy having a diameter from about 1 mil to about 10 mils.

11. The memory element of claim 1, wherein the non-magnetic layer is copper having a thickness of from between about $3\times10^3$ A. and about $20\times10^3$ A.

12. A memory element as claimed in claim 1 wherein said thin layer is a discontinuous layer of cobalt having an equivalent average thickness of from between about 50 A. to about 300 A.

13. A memory element as claimed in claim 1 wherein said thin layer is a discontinuous layer of nickel.

14. A memory element as claimed in claim 1 wherein said thin layer is a discontinuous layer of iron.

15. A memory element comprising
- a non-magnetic wire substrate of beryllium-copper alloy having a diameter of between about 1 mil and about 10 mils
- a non-magnetic layer of copper of controlled roughness having a thickness of between about $3\times10^3$ A. and about $20\times10^3$ A. overlaying the substrate,
- a thin layer of cobalt having an average thickness of from between about 50 A. and about 130° A. overlaying the nonmagnetic layer and
- a zero magnetostrictive magnetic layer of nickel-iron-cobalt alloy overlaying the thin layer and having a thickness of from between about $3\times10^3$ A. and about $15\times10^3$ A., said zero magnetistrictive magnetic layer being formed by electroplating from a bath containing 0.1 to 10 g./l. of an aromatic sulfonic or substituted aromatic sulfonic acid.

References Cited

UNITED STATES PATENTS

| | | | |
|---|---|---|---|
| 3,531,783 | 9/1970 | Doyle | 29—194 |
| 3,717,504 | 2/1973 | Aonuma | 29—199 |
| 3,213,431 | 10/1965 | Kolk | 340—174 PW |
| 3,330,631 | 7/1967 | Tsu | 29—196.3 |
| 3,560,172 | 2/1971 | Kench | 29—196.3 |
| 3,654,697 | 4/1972 | Cole | 340—174 PW |
| 3,683,339 | 8/1972 | Van Kai | 340—174 PW |
| 3,691,032 | 9/1972 | Luborsky | 29—199 |

HYLAND BIZOT, Primary Examiner

U.S. Cl. X.R.

29—196.3, 199; 340—174 PW